(12) United States Patent
Hayes et al.

(10) Patent No.: US 6,835,089 B2
(45) Date of Patent: Dec. 28, 2004

(54) FLEX CABLE AND IDC ELECTRICAL WIRING HARNESS ASSEMBLY

(75) Inventors: Earl J. Hayes, South Lyon, MI (US); Michael J. Alloway, Canton, MI (US); Raymond B. McLauchlan, McComb Township, MI (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 10/307,197

(22) Filed: Nov. 27, 2002

(65) Prior Publication Data

US 2004/0102079 A1 May 27, 2004

(51) Int. Cl.⁷ .............................................. H01R 11/20
(52) U.S. Cl. ....................... 439/404; 174/88 R; 439/422
(58) Field of Search ................................. 439/404, 422, 439/423, 424; 174/88 R (56) References Cited

U.S. PATENT DOCUMENTS

| | | | |
|---|---|---|---|
| 3,197,729 A | | 7/1965 | Sarazen ........................ 339/97 |
| 3,675,180 A | | 7/1972 | Podmore ................... 339/17 F |
| 3,924,917 A | * | 12/1975 | Munshower ................ 439/422 |
| 3,999,826 A | | 12/1976 | Yurtin ....................... 339/17 F |
| 4,002,393 A | * | 1/1977 | Merry et al. ................ 439/422 |
| 4,066,319 A | * | 1/1978 | Baker et al. ................. 439/422 |
| 4,082,402 A | * | 4/1978 | Kinkaid et al. ............. 439/422 |
| 4,508,399 A | * | 4/1985 | Dowling et al. .............. 439/67 |
| 4,576,426 A | | 3/1986 | Hermann ................... 339/17 F |
| 4,749,368 A | | 6/1988 | Mouissie ..................... 439/421 |
| 5,154,618 A | | 10/1992 | Nikoloff et al. ............... 439/67 |
| 5,501,605 A | | 3/1996 | Ozaki et al. .................. 439/34 |
| 5,928,004 A | | 7/1999 | Sumida et al. ............. 439/76.2 |
| 6,066,003 A | | 5/2000 | Chang ........................ 439/607 |
| 6,190,197 B1 | | 2/2001 | Polgar et al. ................ 439/527 |
| 6,238,221 B1 | | 5/2001 | Ikeda et al. ................ 439/76.2 |
| 6,273,499 B1 | | 8/2001 | Guyon ........................ 296/214 |
| 6,280,230 B1 | | 8/2001 | Takase et al. ............... 439/397 |
| 6,290,531 B1 | | 9/2001 | Onizuka et al. ............ 439/397 |

* cited by examiner

Primary Examiner—Neil Abrams
Assistant Examiner—Phuong Dinh
(74) Attorney, Agent, or Firm—Harrington & Smith, LLP (57) ABSTRACT

An electrical wiring harness assembly including a flex cable comprising electrical conductors; and a plurality of insulation displacement connection (IDC) terminals connected to the conductors of the flex cable. The IDC terminals each include a base section, wire insulation displacement sections connected to the base section and having insulation displacement slots, and sets of teeth extending from the base section which extend through the conductors and are outwardly deformed on an opposite side of the flex cable from the base section. The IDC terminals are adapted to connect electrical wires directly to the conductors of the flex cable.

26 Claims, 7 Drawing Sheets

FLEX CABLE AND IDC ELECTRICAL WIRING HARNESS ASSEMBLY

BACKGROUND OF THE INVENTION

1. Field of the Invention

The present invention relates to an electrical wiring harness and, more particularly, to an electrical wiring harness with a flex cable and insulation displacement connection (IDC) terminals.

2. Brief Description of Prior Developments

Flex cables, such as flexible flat conductor cable (FFC) or flexible printed circuit cable (FPC) are generally well known in the art. U.S. Pat. No. 4,749,368 discloses a contact strip terminal which can be attached to a flex cable. U.S. Pat. No. 6,273,499 discloses a vehicle headliner with a flexible printed circuit.

The overhead center console of an automobile is experiencing increased electronic content. As the electronic content increases, the number of electrical circuits increases. There is a desire to provide circuits in an automobile overhead console which save space while maintaining the ability to use more economical discrete wires for longer circuits, such as courtesy lamp circuits.

SUMMARY OF THE INVENTION

In accordance with one aspect of the present invention, an electrical wiring harness assembly is provided including a flex cable comprising electrical conductors; and a plurality of insulation displacement connection (IDC) terminals connected to the conductors of the flex cable. The IDC terminals each include a base section, wire insulation displacement sections connected to the base section and having insulation displacement slots, and sets of teeth extending from the base section which extend through the conductors and are outwardly deformed on an opposite side of the flex cable from the base section. The IDC terminals are adapted to connect electrical wires directly to the conductors of the flex cable.

In accordance with another aspect of the present invention, an electrical wiring harness assembly is provided comprising a flex cable comprising electrical conductors; and a plurality of insulation displacement connection (IDC) terminals directly attached to the flex cable. The IDC terminals are adapted to have electrical wires connected thereto in insulation displacement slots. The assembly also includes an overmolded housing which has been overmolded onto portions of the flex cable and the IDC terminals; and power contacts directly connected to the flex cable at an end of the cable. The power contacts are electrically connected to the conductors of the flex cable. The housing forms a receiving area around the power contacts to receive an electrical connector for mating with the power contacts.

In accordance with one method of the present invention, a method of assembling an electrical wiring harness assembly is provided comprising steps of connecting insulation displacement connection (IDC) terminals directly to a flex cable; and connecting power contacts directly to the flex cable. The IDC terminals and the power contacts are connected by conductors of the flex cable. The IDC terminals and the power contacts each comprise sets of teeth which extend through the flex cable and are outwardly deformed to attach the IDC terminals and the power contacts to the flex cable.

In accordance with another aspect of the present invention, an insulation displacement connection (IDC) terminal is provided comprising a base section; wire connection sections extending from the base section; and flex cable connection sections extending from the base section. The wire connection sections have insulation displacement slots. The flex cable connection sections each comprise a set of conductor piercing teeth which are adapted to pierce through electrical conductors of a flex cable and make electrical connection with the electrical conductors and be outwardly deformed to capture portions of the flex cable between the teeth and the base section for physically mounting the IDC terminal to the flex cable.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

The present invention is for a connection assembly aimed primarily at connecting the headliner wiring harness of an automobile to the body wiring harness. The connection assembly provides the additional function of interconnecting discrete wires to a flat flexible cable (FFC) or flexible printed circuits (FPC) via a combined insulation displacement crimped (IDC) and star crimp terminal.

The present invention provides a means to have circuits in the overhead console be manufactured using flat flex technology in order to save space while maintaining the ability to use more economical discrete wires for the longer courtesy lamp circuits. The invention can use FPC to interconnect the various electrical interfaces. The IDC to FPC interface can be accomplished via a stamped terminal that utilizes star crimp technology to terminate it to the FPC.

Advantages of the invention include low tooling cost, adjustability, small size, and low cost. In regard to low tooling cost, using FPC for the circuits of the assembly eliminates the need for large, progressive dies. In regard to adjustability, because large stamping dies are not required, the connection assembly can be adjusted to accommodate various circuit requirements. In regard to small size, the main body is overmolded onto the FTC and terminals. This reduces the size of the assembly. In regard to low-cost, simplicity of the design and lower tooling costs can reduce piece price of the assembly.

Figure 1:
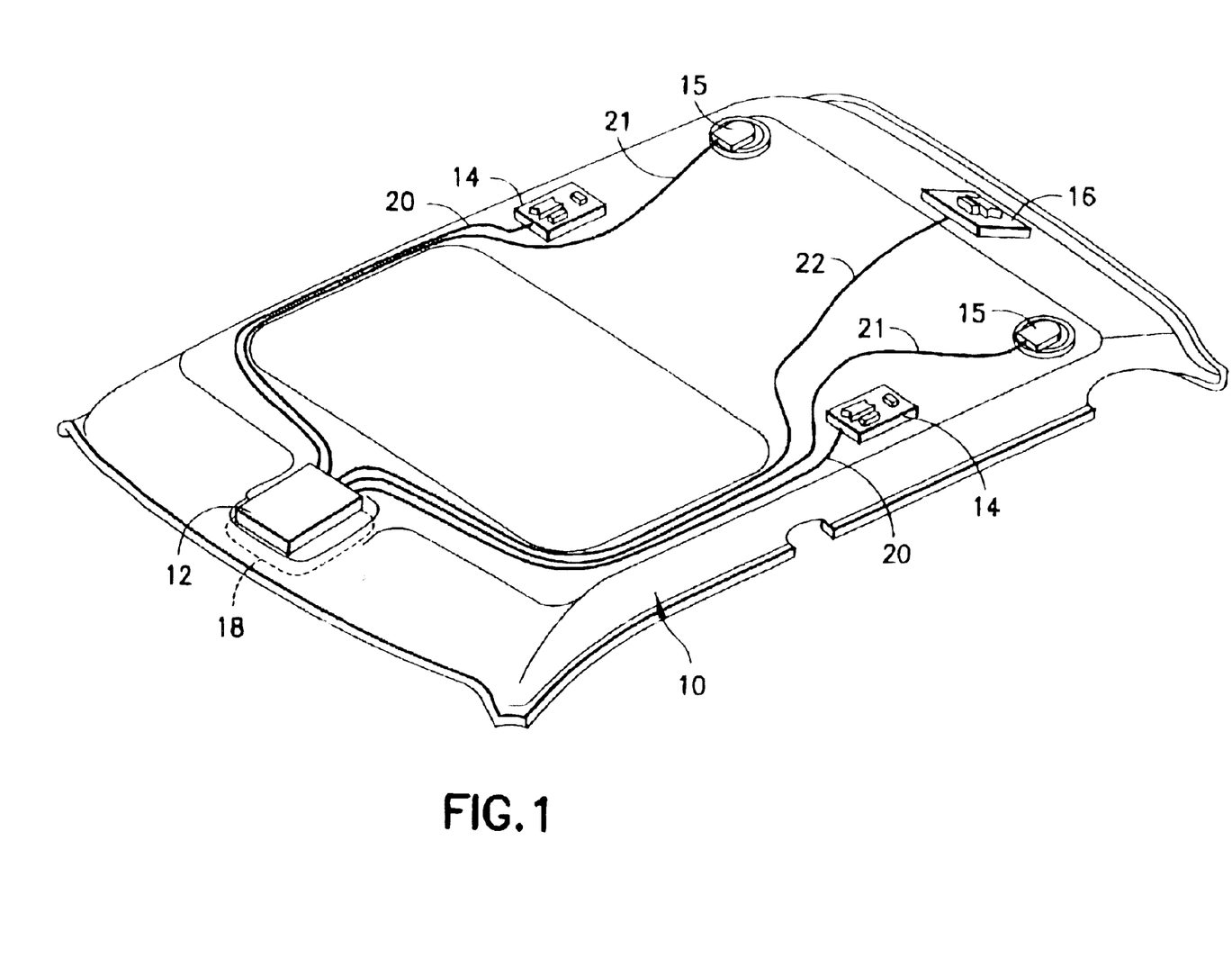
FIG. 1 is a perspective view of an automobile headliner having courtesy lights, a center overhead console, and an electrical wiring harness assembly incorporating features of the present invention.

Referring to FIG. 1, there is shown a perspective view of an automobile headliner 10 having a electrical wiring harness assembly 12 incorporating features of the present invention. Although the present invention will be described with reference to the exemplary embodiments shown in the drawings, it should be understood that the present invention can be embodied in many alternate forms of embodiments. In addition, any suitable size, shape or type of elements or materials could be used.

The headliner 10 is generally made up of several thicknesses of textile material. The headliner 10 includes openings which are intended to receive overhead courtesy lights 14, 15 and 16. The front of the headliner 10 is adapted to receive a main overhead console 18. The overhead console 18 can include such features as courtesy lights, sunroof controls, and garage door opener controls, for example. The assembly also comprises groups 20, 21, 22 of discrete electrical wires connected to the courtesy lights on 14, 15, 16. The discrete electrical wires can provide electricity for the lights 14, 15, 16. The headliner 10, courtesy lights 14–16, and the groups of discrete electrical wires 20–22 are generally well known in the art. In alternate embodiments, any suitable type of headliner, courtesy lights or groups of discrete electrical wires could be provided.

As noted above, the assembly shown in FIG. 1 includes an electrical wiring harness assembly 12. Referring also to FIGS. 2–5, the wiring harness assembly 12 is operably connected to the groups 20–22 of the discrete electrical wires and is operably connected to the overhead center console 18. The wiring harness assembly generally comprises a housing 24, a flex cable 26, a plurality of insulation displacement connection (IDC) terminals 28, power contacts 30, and splice terminals 32. However, in alternate embodiments, the wiring harness assembly 12 could comprise additional or alternative components.

Figure 4:
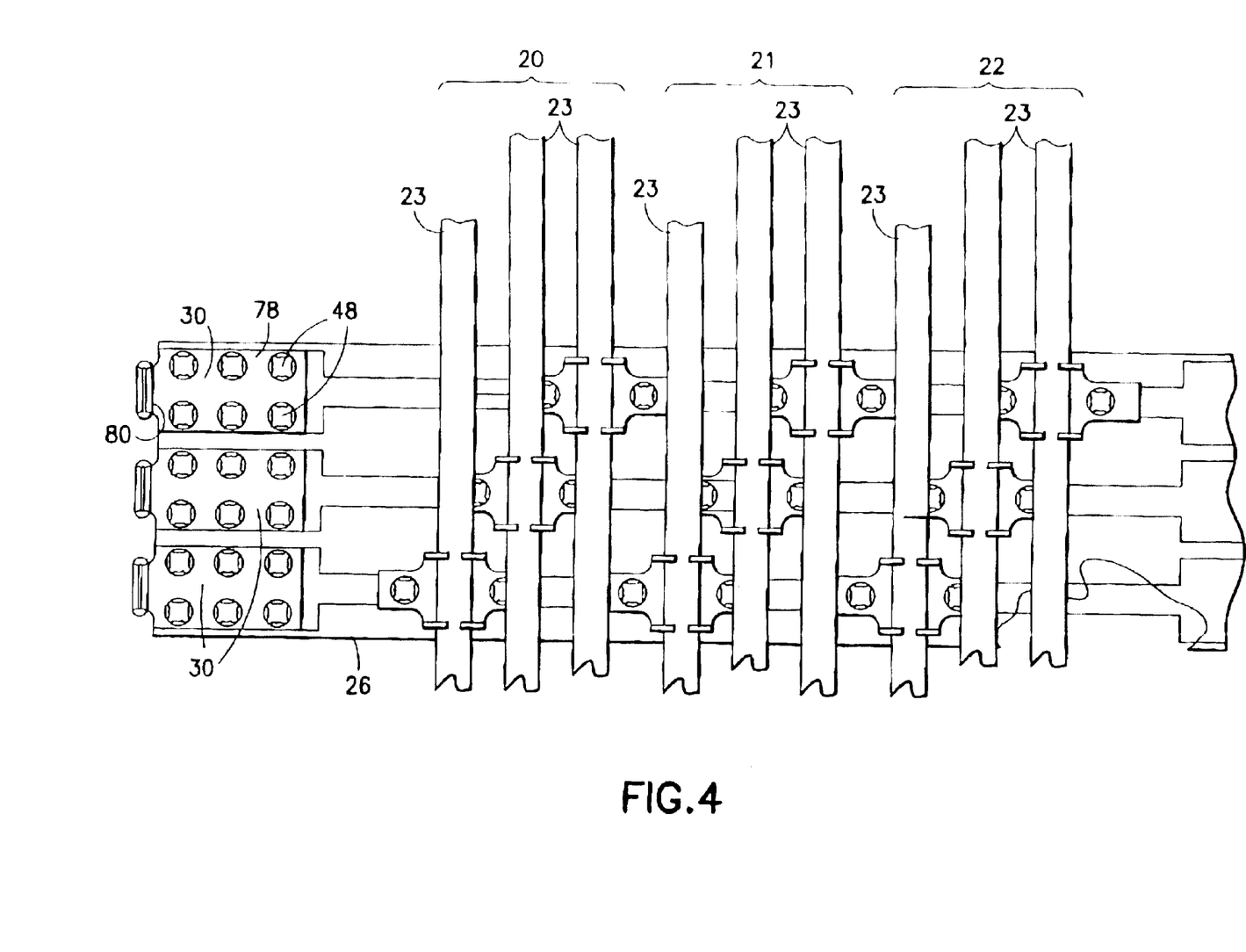
FIG. 4 is a top plan view of the flex cable, power contacts, IDC contacts and wires of the electrical wiring harness shown in FIGS. 2 and 3.
Figure 5:
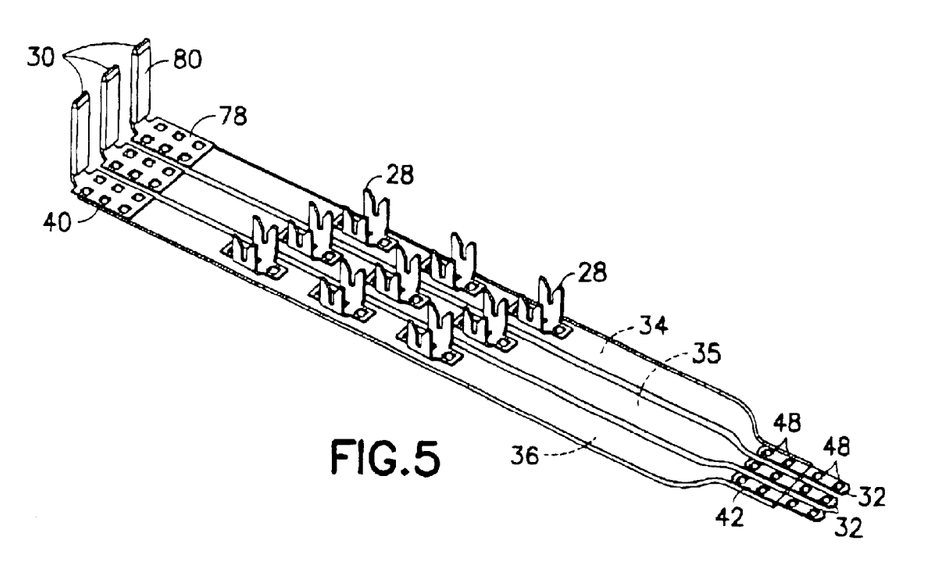
FIG. 5 is a perspective view of a subassembly comprising the flex cable, IDC terminals, power contacts, and splice terminals before overmolding of the overmolded housing to form the electrical wiring harness assembly shown in FIGS. 2 and 3.

As used herein, the term "flex cable" is intended to mean a flexible flat conductor cable (FFC) or a flexible printed circuit cable (FPC). In the embodiment shown, the flex cable 26 is a flexible printed circuit cable. The flex cable 26 includes three flat electrical conductors 34, 35, 36 surrounded by flat electrical insulation 38. The conductors 34, 35, 36 each comprise two end connection areas 40, 42. The first end connection areas 40 have the power contacts 30 connected thereto. The second end connection areas 42 have the splice terminals 32 connected thereto. The IDC terminals 28 are connected to the conductors 34, 35, 36 between the two end connection areas 40, 42.

In this embodiment, three of the IDC terminals 28 are connected to each one of the conductors 34, 35, 36. However, in alternate embodiments, any suitable number of IDC terminals could be connected to each one of the conductors. The IDC terminals 28 on each conductor are offset from the IDC terminals in the other conductors such that the wires 23 can be connected to the IDC terminals 28 in offset parallel adjacent paths as shown in FIG. 4.

Figure 6:
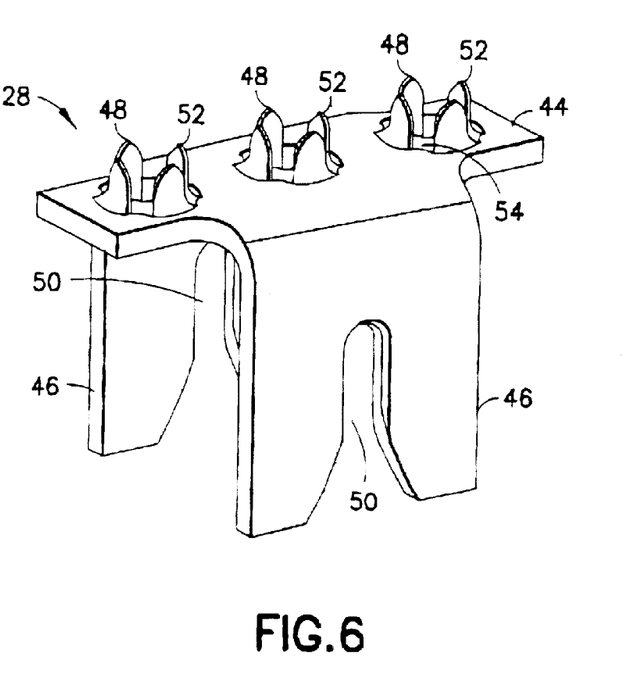
FIG. 6 is a perspective view of one of the IDC terminals of the electrical wiring harness assembly.
Figure 7:
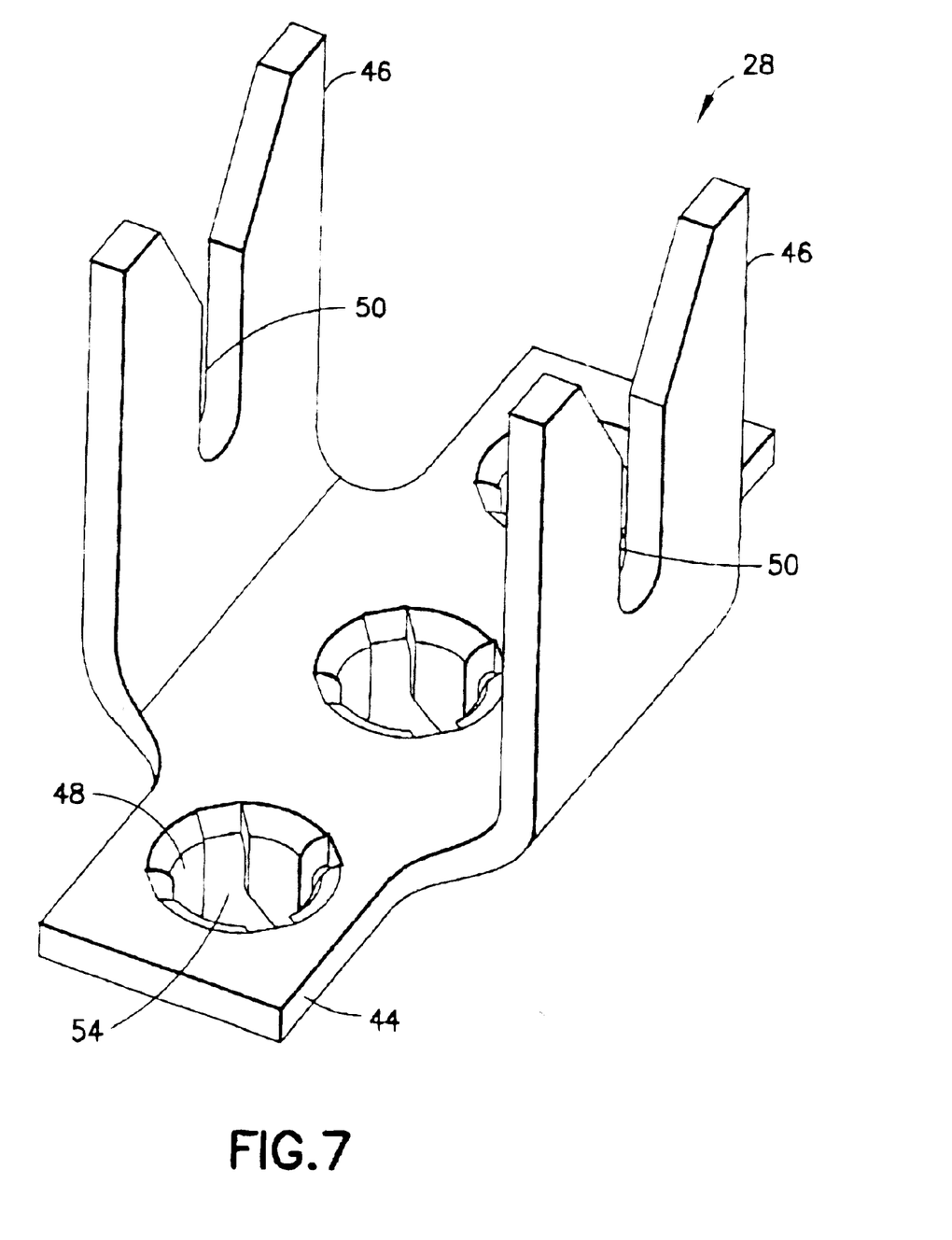
FIG. 7 is a perspective view of the IDC terminal shown in FIG. 6 from an opposite direction.

Referring also to FIGS. 6 and 7 one of the IDC terminals 28 is shown. Each IDC terminals 28 is preferably comprised of flat sheet metal which has been cut and formed, such as by stamping, to form the shape shown. Each IDC terminal 28 generally comprises a base section 44, wire connection sections 46, and flex cable connection sections 48. The wire connection sections 46 extends from the base section 44 in a first direction. Each wire connection section 46 comprises an insulation displacement slot 50. The slots 50 are sized and shaped to pierce through the insulation of the wires 23 and form an electrical connection with the wire conductors inside the insulation. The wire connection sections 46 are generally mirror images of each other and extend from opposite lateral sides of the base section 44, but are bent in the same direction as shown.

The flex cable connection sections 48 extend from the base section 44 in a second opposite direction from the wire connection sections 46. In the embodiment shown, the IDC terminals 28 comprises three of the flex cable connection sections. However, in alternate embodiments, any suitable number of flex cable connection sections could be provided. Each flex cable connection section 48 generally comprises a set of conductor piercing teeth 52. A center hole 54 is formed when the teeth 52 are cut and formed in the second direction. The teeth 52 are adapted to pierce through the insulation 38 and electrical conductors 34, 35, 36 of the flex cable 26 and make electrical connection with the electrical conductors. Each set of teeth 52 are arranged in a general circle and are deformed radially outward relative to the circle around the hole 54. The teeth 52 are outwardly deformed to capture portions of the flex cable between the teeth and the base section 44 for physically mounting the IDC terminals 28 to the flex cable 26. As seen with reference to FIG. 4, when the wires 23 are connected to the IDC terminals 28, one of the wires in each one of the groups 20, 21, 22 are connected to a respective one of the conductors 34, 35, 36.

The power contacts 30 are preferably comprised of stamped and formed sheet metal. Each power contact 30 comprises a first connection section 78 and a second connection section 80. In the embodiment shown, the first connection section 78 is generally orthogonal to the second connection section 80. The first connection section 78 comprises six sets of flex cable connection sections 48 having conductor piercing teeth substantially identical to the flex cable connection sections 48 and teeth 52 shown in FIG. 6. The first connection section 78 is physically and electrically attached to an end of the flex cable 26 at the end connection areas 40. The second connection section 80 comprises a male contact post adapted to be received in a female contact of the mating electrical connector (not shown).

The splice terminals 32 are preferably comprised of stamped and formed sheet metal. The splice terminals 32 are mechanically and electrically connected to the flex cable 26 and to the conductors at the end connection areas 42. Each splice terminals 32 comprises four of the flex cable connection sections 48 of each splice terminal having conductor piercing teeth substantially identical to the flex cable connection sections 48 and teeth 52 shown in FIG. 6. Two of the flex cable connection sections 48 of each splice terminal are connected to one of the conductors 34, 35, 36. The other two flex cable connection sections 48 on each splice terminal 32 are adapted for connection to another flex cable (not shown). Thus, the flex cable 26 can be connected to another flex cable, such as a flex cable connected to the overhead console 18. In addition, the flex cable 26 can be electrically connected to the wires 23 at the IDC terminals 28 and an electrical connector from a power source at the power contacts 30.

Referring back to FIGS. 2 and 3, the housing 24 generally comprises an overmolded housing 56, and a housing cover 58. Before the wires 23 are connected to the IDC terminals 28 the overmolded housing 56 is overmolded onto the flex cable 26. The overmolded housing 56 generally comprises a first section 60 and a second section 62. The first section 60 forms an electrical connector receiving area 64 around the power contacts 30. The receiving area 64 is sized and shaped to receive an electrical connector for connecting the power contacts 30 to an electrical power source of the automobile. Thus, this can connect the IDC terminals 28 to the power source and the wires 23 to the power source.

Figure 2:
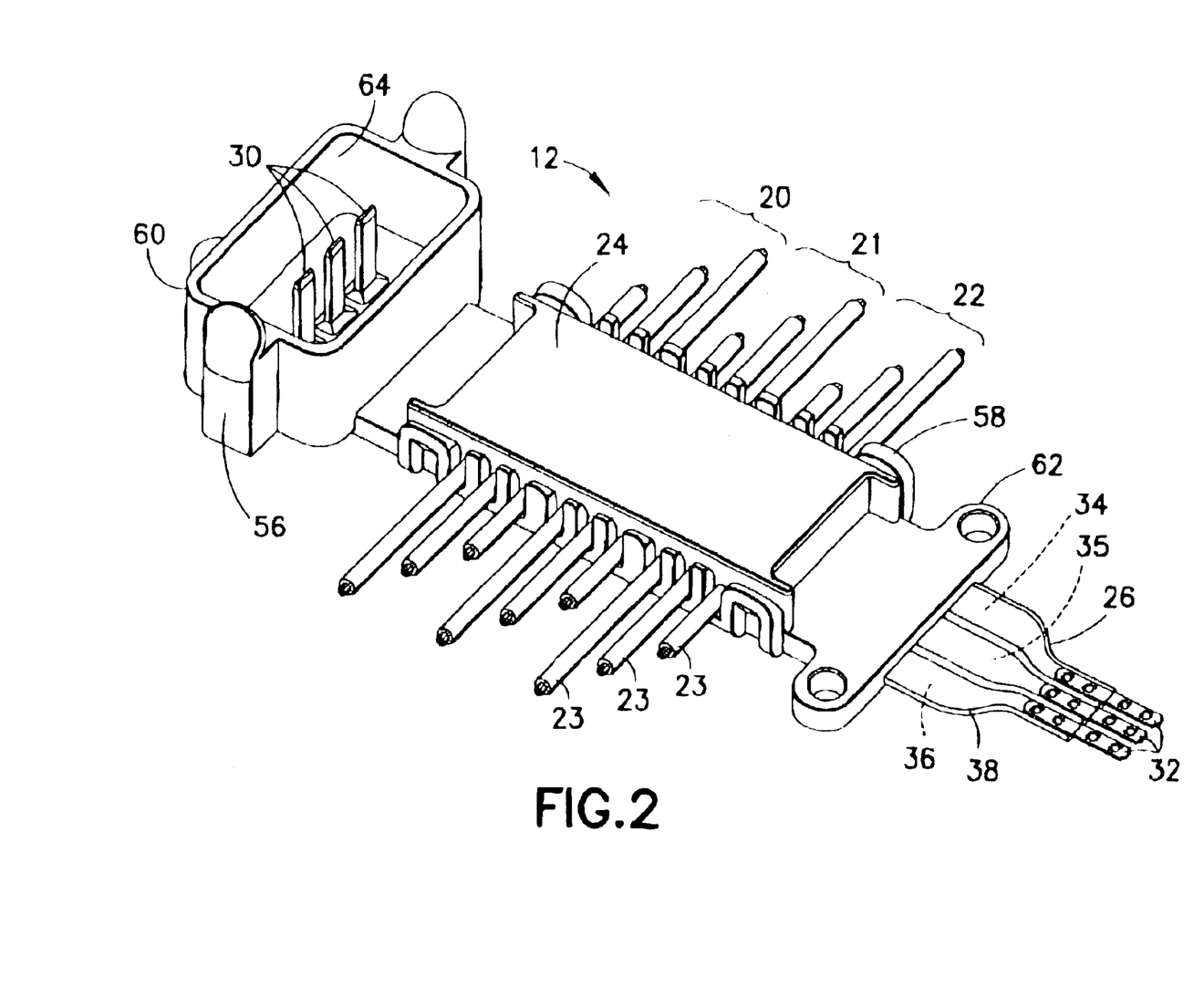
FIG. 2 is a perspective view of the electrical wiring harness assembly shown in FIG. 1 shown attached to wires which are connected to the courtesy lights.
Figure 3:
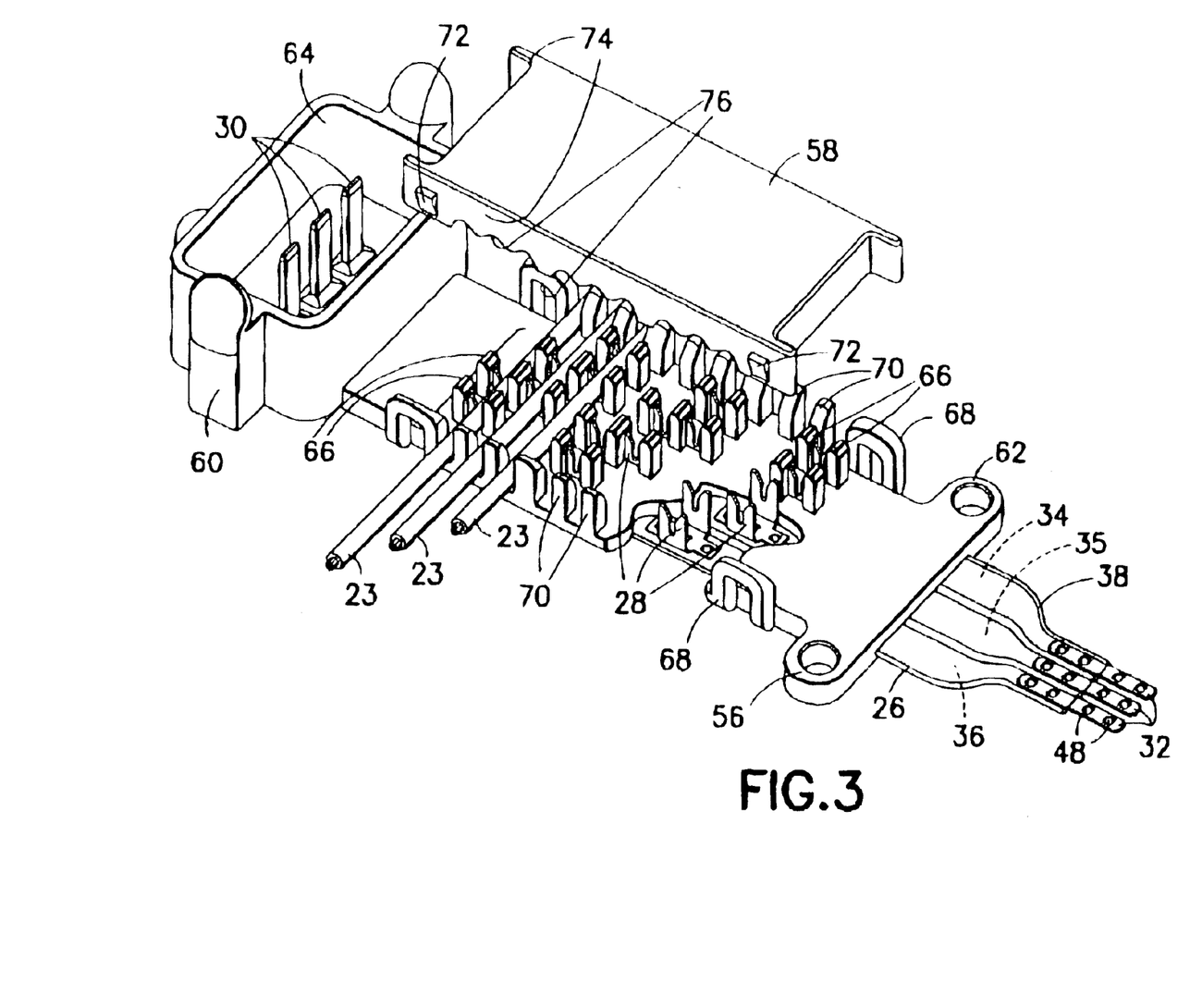
FIG. 3 is a perspective view of the electrical wiring harness assembly shown in FIG. 2 with the cover of the housing shown in an exploded view, and a portion of the overmolded housing cut away.

The second section 62 of the overmolded housing 56 generally comprises IDC terminal supports 66, snap lock latches 68, and wire guides 70. The IDC terminal support 66 are provided for each one of the legs of the wire connection sections 46 of the IDC terminals. The wire guides 70 are located at the outer lateral edges of the second section 62 to form receiving channels for the wires 23. The snap lock latches 68 are also provided at the outer lateral edges of the second section 62 and are adapted to receive snap lock latches 72 of the housing cover 58.

The housing cover 58 comprises the snap lock latches 72 which are located on lateral sidewalls 74. The bottom edges of the sidewalls 74 comprise grooves 76 for capturing the electrical wires 23 between the housing cover 58 and the overmolded housing 56 in the grooves 76. The two housing pieces 56, 58 can, thus, form a strain relief for the wires 23.

The present invention is for a connection assembly aimed primarily at connecting the headliner wiring harness of an automobile to the body wiring harness. The connection assembly provides the additional function of interconnecting discrete wires to a flat flexible cable (FFC) or flexible printed circuits (FPC) via a combined insulation displacement crimped (IDC) and star crimp terminal. The interface of the connection assembly to the body harness can be accomplished by means of a BlindMate™ connector geometry.

The present invention provides a means to have circuits in the overhead console be manufactured using flat flex technology in order to save space while maintaining the ability to use more economical discrete wires for the longer courtesy lamp circuits. The invention can use FPC to interconnect the various electrical interfaces. The IDC to FPC interface can be accomplished via a stamped terminal that utilizes star crimp technology to terminate it to the FPC. The connection assembly to center console electronics can be handled in at least one of three ways:

the interconnection can be permanently accomplished via a four-star NetFlex™ splice terminal; or the connection assembly could incorporate a Modu-Pack™ connector half in order to provide a separable interconnect to the center consol electronics; or the FPC for the connection assembly and the center consol electronics can be one continuous piece.

Figure 8:
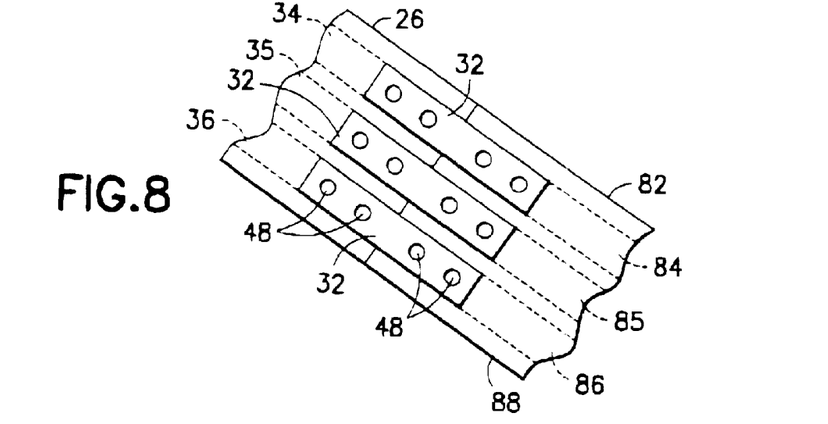
FIG. 8 is a partial perspective view showing one type of connection between the electrical wiring harness assembly and a second flex cable.

Referring now to FIG. 8, a schematic view of the connection of the flex cable 26 to a second flex cable 82 is shown. The second flex cable 82 comprises three electrical conductors 84, 85, 86 surrounded by flat electrical insulation 88. The second flex cable 82 is operably connected to the overhead console 18 (see FIG. 1). The splice terminals 32 mechanically connect the flex cables 26, 82 to each other. In addition, the splice terminals 32 also connect respective ones of the conductors 34–36 to respective ones of the conductors 84–86. This illustrates the first way of connecting the assembly to the center console noted above.

Figure 9:
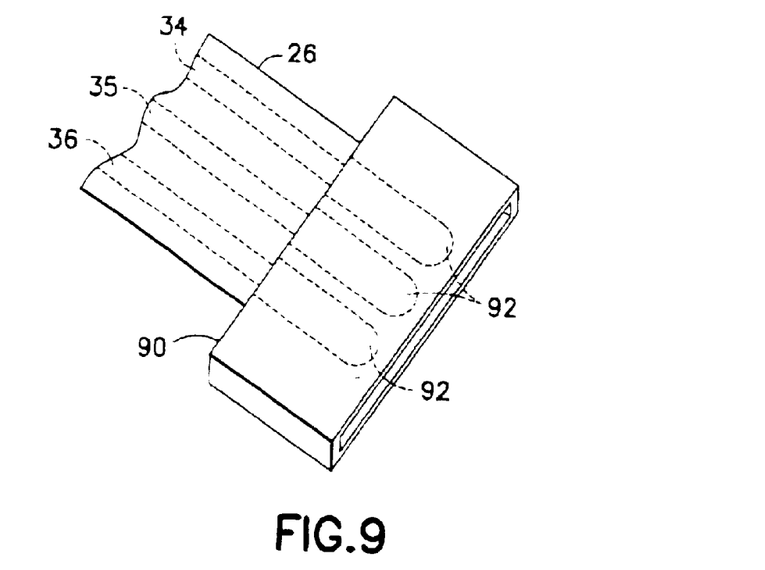
FIG. 9 is a partial perspective view showing another type of connection configuration for removably connecting the electrical wiring harness assembly to the center overhead console.

Referring now to FIG. 9, the second way of connecting the assembly to the center console can comprise attaching an electrical connector 90 to the end of the flex cable 26. The electrical connector 90 is adapted to be removably connected to a mating electrical connector which is connected to the overhead console 18. Thus, a removable connection can be provided between the overhead console 18 and the wiring harness assembly. The electrical connector 90 would comprise electrical contacts 92 attached to respective ones of the conductors 34–36.

Figure 10:
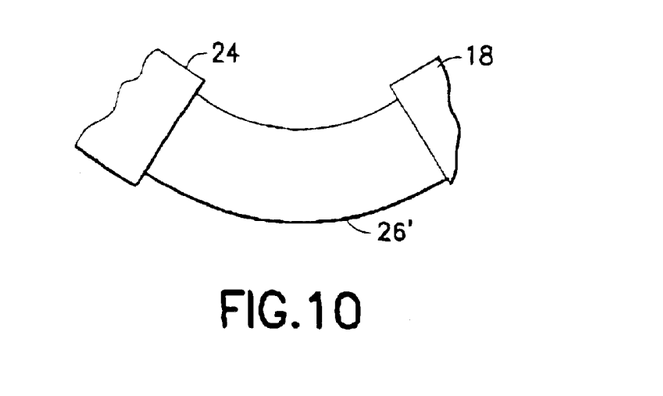
FIG. 10 is a partial schematic view showing another type of connection configuration of the electrical wiring harness assembly to the center overhead console by means of a single flex cable.

Referring now to FIG. 10, the third way of connecting the assembly to the center console can comprise the flex cable 26' extending out of the housing 24 and to the overhead center console 18 as one continuous piece.

Advantages of the invention include:

Low tooling cost. Using FPC for the circuits of the assembly eliminates the need for large, progressive dies.

Adjustability. Because large stamping dies are required, the connection assembly can be adjusted to accommodate various circuit requirements.

Small size. The main body is overmolded onto the FTC and terminals. This reduces the size of the assembly.

Low-cost. Simplicity of the design and lower tooling costs reduces piece price of the assembly.

In alternate embodiments, the IDC terminals, splice terminals and power terminals could comprise any suitable type of shape and connection sections. In addition, the housing could also be comprised of any suitable number of member(s) having any suitable type of shape. The connector interface between the power supply and to the overhead console could also comprise any suitable type of connection. The flex connector of the assembly could also be adapted to be connected to other components. In addition, the number of discrete electrical wires 23 that can be attached to the wiring harness assembly could be more or less than the nine wires shown in the preferred embodiment.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electrical wiring harness assembly comprising:

a flex cable comprising electrical conductors; and a plurality of insulation displacement connection (IDC) terminals connected to the conductors of the flex cable, the IDC terminals each comprising a base section, wire insulation displacement sections connected to the base section and having insulation displacement slots, and sets of teeth extending from the base section which extend through the conductors and are outwardly deformed on an opposite side of the flex cable from the base section, wherein the IDC terminals are adapted to connect electrical wires directly to the conductors of the flex cable, wherein each set of teeth are arranged in a general circle and are deformed radially outward relative to the circle.

2. An electrical wiring harness assembly as in claim 1 further comprising splice terminals connected to the electrical conductors which are adapted to be attached to another flex cable.

3. An electrical wiring harness assembly as in claim 1 further comprising an electrical connector connected to the electrical conductors.

4. An electrical wiring harness assembly as in claim 1 wherein the IDC terminals each comprise a stamped flat metal member with the wire insulation sections extending in a first direction from the base section and the sets of teeth extending in an opposite second direction from the base section.

5. An electrical wiring harness assembly as in claim 1 further comprising power contacts directly connected to the flex cable, wherein the power contacts are electrically connected to the electrical conductors of the flex cable.

6. An electrical wiring harness assembly comprising:
   a flex cable comprising electrical conductors;
   a plurality of insulation displacement connection (IDC) terminals connected to the conductors of the flex cable, the IDC terminals each comprising a base section, wire insulation displacement sections connected to the base section and having insulation displacement slots, and sets of teeth extending from the base section which extend through the conductors and are outwardly deformed on an opposite side of the flex cable from the base section, wherein the IDC terminals are adapted to connect electrical wires directly to the conductors of the flex cable, and
   an overmolded housing on portions of the flex cable and the IDC terminals.

7. An electrical wiring harness assembly as in claim 6 further comprising a housing cover snap lock mounted onto the overmolded housing.

8. An electrical wiring harness assembly as in claim 7 wherein the housing cover comprises a side wall with grooves for capturing the electrical wires between the housing cover and the overmolded housing in the grooves.

9. An electrical wiring harness assembly as in claim 6 further comprising power contacts directly connected to the flex cable, wherein the power contacts are electrically connected to the electrical conductors of the flex cable, and wherein the overmolded housing forms an electrical connector receiving area around the power contacts.

10. An electrical wiring harness assembly comprising:
    a flex cable comprising electrical conductors;
    a plurality of insulation displacement connection (IDC) terminals directly attached to the flex cable, the IDC terminals being adapted to have electrical wires connected thereto in insulation displacement slots;
    an overmolded housing which has been overmolded onto portions of the flex cable and the IDC terminals; and
    power contacts directly connected to the flex cable at an end of the cable, wherein the power contacts are electrically connected to the conductors of the flex cable, and wherein the housing forms a receiving area around the power contacts to receive an electrical connector for mating with the power contacts.

11. An electrical wiring harness assembly as in claim 10 further comprising splice terminals connected to the electrical conductors which are adapted to be attached to another flex cable.

12. An electrical wiring harness assembly as in claim 10 further comprising an electrical connector spaced from the power contacts and connected to the electrical conductors.

13. An electrical wiring harness assembly as in claim 10 wherein the IDC terminals each comprise sets of teeth extending from a base section of the IDC terminal which extend through the conductors and are outwardly deformed on an opposite side of the flex cable from the base section, and wherein each set of teeth are arranged in a general circle and are deformed radially outward relative to the circle.

14. An electrical wiring harness assembly as in claim 10 wherein the IDC terminals each comprise a stamped flat metal member with wire insulation sections having the insulation displacement slots extending in a first direction from a base section and sets of teeth extending in an opposite second direction from the base section.

15. An electrical wiring harness assembly as in claim 10 further comprising a housing cover snap lock mounted onto the overmolded housing.

16. An electrical wiring harness assembly as in claim 15 wherein the housing cover comprises a side wall with grooves for capturing the electrical wires between the housing cover and the overmolded housing in the grooves.

17. A method of assembling an electrical wiring harness assembly comprising steps of:
    connecting insulation displacement connection (IDC) terminals directly to a flex cable; and
    connecting power contacts directly to the flex cable,
    wherein the IDC terminals and the power contacts are connected by conductors of the flex cable, and wherein the IDC terminals and the power contacts each comprise sets of teeth which extend through the flex cable and are outwardly deformed to attach the IDC terminals and the power contacts to the flex cable, wherein each set of teeth are arranged in a general circle and are deformed radially outward relative to the circle.

18. A method as in claim 17 further comprising connecting the flex cable to another flex cable.

19. A method as in claim 18 wherein the step of connecting the flex cable to another flex cable comprises attaching splice terminals to the flex cables, the splice terminals each comprising sets of teeth which extend through the flex cables and are outwardly deformed to attach the splice terminals to the flex cables.

20. A method as in claim 18 wherein the step of connecting the flex cable to another flex cable comprises attaching flex cables to each other by disconnectable electrical connectors.

21. A method as in claim 17 further comprising connecting electrical wires to the flex cable by inserting the wires into insulation displacement slots of the IDC terminals.

22. A method of assembling an electrical wiring harness assembly comprising steps of:
    connecting insulation displacement connection (IDC) terminals directly to a flex cable;
    connecting power contacts directly to the flex cable, wherein the IDC terminals and the power contacts are connected by conductors of the flex cable, and wherein the IDC terminals and the power contacts each comprise sets of teeth which extend through the flex cable and are outwardly deformed to attach the IDC terminals and the power contacts to the flex cable, and
    overmolding a housing onto a portion of the flex cable and around portions of the IDC terminals and the power contacts.

23. A method as in claim 22 further comprising snap lock attaching a housing cover to the overmolded housing, wherein the housing cover comprises a side wall with grooves for capturing electrical wires which are connected to the IDC terminals between the housing cover and the overmolded housing in the grooves.

24. An insulation displacement connection (IDC) terminal comprising:
a base section;
wire connection sections extending from the base section, the wire connection sections having insulation displacement slots; and
flex cable connection sections extending from the base section, the flex cable connection sections each comprising a set of conductor piercing teeth which are adapted to pierce through electrical conductors of a flex cable and make electrical connection with the electrical conductors and be outwardly deformed to capture portions of the flex cable between the teeth and the base section for physically mounting the IDC terminal to the flex cable, wherein each set of teeth are arranged in a general circle and are deformed radially outward relative to the circle.

25. An insulation displacement connection (IDC) terminal as in claim 24 wherein the IDC terminals each comprise a stamped flat metal member with the wire connection sections extending in a first direction from a base section and the sets of teeth extending in an opposite second direction from the base section.

26. An insulation displacement connection (IDC) terminal comprising:
a base section;
wire connection sections extending from the base section, the wire connection sections having insulation displacement slots; and
flex cable connection sections extending from the base section, the flex cable connection sections each comprising a set of at least three conductor piercing teeth which are adapted to pierce through electrical conductors of a flex cable and make electrical connection with the electrical conductors and be outwardly deformed to capture portions of the flex cable between the teeth and the base section for physically mounting the IDC terminal to the flex cable, wherein each set of teeth are arranged in a general ring shaped pattern extending from the base section.

* * * * *